Jan. 11, 1949.　　　S. J. EVERETT　　　2,458,934
METHOD OF FORMING PRECISION BORE GLASS TUBING
Original Filed Nov. 22, 1941
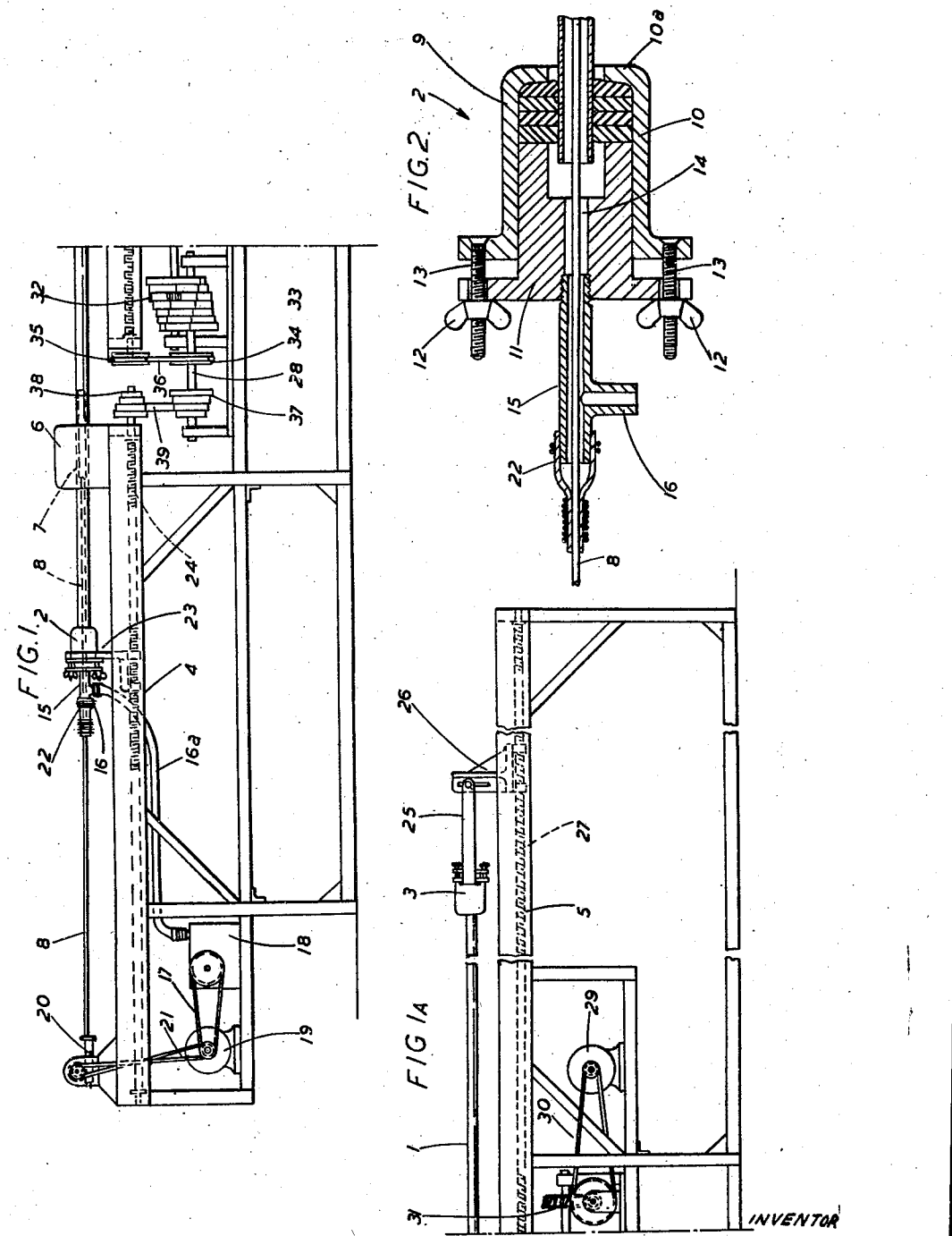
INVENTOR
SAMUEL JAMES EVERETT,
BY
Robert B. Larson
ATTORNEY Patented Jan. 11, 1949

2,458,934

UNITED STATES PATENT OFFICE 2,458,934

METHOD OF FORMING PRECISION BORE GLASS TUBING

Samuel James Everett, Thornton Heath, England, assignor to James A. Jobling & Co. Ltd., Sunderland, England, a British company Original application November 22, 1941, Serial No. 420,121. Divided and this application December 28, 1945, Serial No. 637,572. In Great Britain February 8, 1941

6 Claims. (Cl. 49—84)

This invention relates to the manufacture of plastic tubes, particularly glass, tubes and comprises matter divided from application for Letters Patent Serial No. 420,121, filed November 22, 1941, now Patent No. 2,393,979, issued February 5, 1946. That application is concerned with apparatus for manufacturing glass tubes that have extremely accurately shaped internal surfaces, that is to say have surfaces that are absolutely true and smooth, with the fine quality that can be obtained by grinding and lapping or polishing. Plastic material that is particularly suitable for this purpose is ordinary glass or low-expansion glass and the tubing made both in accordance with the aforesaid patent application and with the present application can conveniently be employed for the cylinders of hypodermic syringes.

According to the present invention, a method for providing a pre-formed thermoplastic tube with a fine quality internal surface comprises the steps of moving the tube over and in engagement with a surface having the dimensions of the desired internal dimensions of the tube, heating the tube in the vicinity of its engagement with said surface, and controlling the speed of movement of the tube so that the movement in the direction away from said surface is greater than that toward said surface. The initial tube or cane preferably has a greater internal diameter than the said surface and the wall thickness of the tube is generally somewhat greater than the wall thickness of the finished tube. Then, as the heated tube is drawn over said surface or former, the tube wall collapses upon the former due to the tension applied to the tube. The former, which of course is very accurately shaped so as to impart to the inside of the tube a true, parallel, and absolutely smooth surface, may conveniently be arranged so that it projects horizontally into the furnace for heating the glass. When a tube of circular cross-section is being made, it is preferred to cause the former to rotate about its axis, but when a tube of non-circular cross-section is being shaped the former, of course, cannot be rotated.

In order that the invention may be clearly understood and readily carried into effect, arrangements in accordance therewith will now be described, by way of example, with reference to the accompanying drawings, in which—

Figure 1 is a side elevation of a part of the apparatus for use when carrying the invention into effect, Figure 1A is a side elevation of the remaining part of the apparatus shown in Figure 1 for use when carrying the invention into effect, and Figure 2 is a cross-section on an enlarged scale of a detail of the apparatus in Figure 1.

The apparatus shown in Figures 1 and 1A is arranged for the purpose of shaping the internal surfaces of glass tubes, and is constructed so that the glass tube 1 being treated is supported between chucks 2 and 3, which are fed along guides 4 and 5 to carry the glass tube 1 through a furnace 6 where the tube is heated sufficiently to cause it to become plastic. The effect of this is to cause the internal surface of the tube to conform accurately to the external surface of a former 7 over which the tube passes as it travels through the furnace 6. The former 7 is carried by a rod 8 that projects through the chuck 2 and into the glass tube 1.

Each of the chucks 2 and 3 contains a pack of rubber rings 9, as shown in Figure 2 in which the details of the chuck 2 appear. The pack of rubber rings 9 is contained between an annular abutment 10a on a sleeve 10 and a gland member 11, which is tightened upon the rings 9 in an axial direction so that they expand internally and grip the tube. The axial tightening of the gland member 11 is effected through the medium of finger nuts 12 that bear on the member 11 and are threaded upon studs 13 secured to the sleeve 10. The gland member 11 is formed with a central passage 14 which receives a T-piece 15, the limb 16 of which is connected by a flexible pipe 16a to a vacuum pump 18 driven through a driving belt 17 by an electric motor 19. The rod 8 that supports the former 7 passes through the horizontal portion of the T-piece 15 to worm reduction gearing 20, whereby the motor 19, acting through a driving belt 21, is enabled to rotate the rod 8 and former 7 about their common axis.

To enable the vacuum pump 18 to maintain a reduced pressure in the pipe 1, a seal is provided between the T-piece 15 and the rod 8, the seal consisting, as shown in Figure 2, of an appropriate flexible sleeve 22 bound upon one end of the T-piece 15 and upon the rod 8. The friction between the sleeve 22 and the rod 8, however, is not so great that the latter cannot turn relatively to the sleeve.

The vacuum pump 18, by exhausting the air from inside the tube 1, prevents corrosion of the former 7, any oxygen within the tube 1 being substantially exhausted by the pump 18, and enables the outside air pressure to assist in the closing of the tube 1 on to the former 7, it being understood that the internal diameter of the tube 1 is initially slightly greater than the external diameter of the former.

It will be seen that the former 7 projects a few inches out of the furnace 6 on the discharge side thereof, so as to give support to the tube until it has substantially solidified. Suitable materials for the former 7 are pure silica, the metal alloy known under the registered trademark "Inconell," and stainless steel. When the former is made of pure silica, it is slightly tapered in the direction of the movement of the tube. When it is made of an alloy such as stainless steel, it is convenient to use an untapered former, because, when the apparatus is in operation, the part of the former that projects from the furnace 6 is cooler than the part of the former lying within the furnace 6. The former, therefore, expands unevenly along its length and becomes slightly tapered as is required to enable the tube to be more easily drawn off the former. Furthermore, it is advantageous to coat the bore of the tube with colloidal graphite so as to enable the tube to slide more readily on the former. In the example being described the former rotates at 79 revolutions per minute and the rotation of the former ensures that the inner surface of the tube shall be round, even if the former is not truly so (measurements of the order of 0.00001 inch being considered in this connection). It has been found advantageous to provide the rotating former with a narrow flat surface along one side so that the cross-section of the former appears as a circle with a small segment removed.

The chuck 2 is supported by a carriage 23, the speed of the carriage 23 along the guide 4 being controlled by a lead screw 24, while the glass tube 1 is drawn through the furnace 6 by the chuck 3, which is supported by forwardly extending arms 25 from a carriage 26 driven along the guide 5 by a lead screw 27. The lead screws 24 and 27 are driven from a countershaft 28, driven by a motor 29. The connection between the motor and countershaft includes a belt 30, a 19:1 worm reduction gear 31, and stepped cone pulleys 32 and 33 permitting some variation in the speed ratio between the motor 29 and the countershaft 28, so that the resultant speed at which the glass tube 1 passes through the furnace 6 may be adjusted. The arrangement is such that the pulley 32 rotates at 20 revolutions per minute and the speed of the countershaft can be varied between 10 and 20 revolutions per minute. The countershaft 28 drives the lead screw 27 at an equal speed through the medium of pulleys 34 and 35, connected by a belt 36. The gear ratio between the countershaft 28 and the other lead screw 24, however, is variable through the medium of stepped cone pulleys 37 and 38 connected by a belt 39. Therefore, the relative movement between the chucks 2 and 3 can be altered to adjust the amount the glass tube is stretched, as it passes through the furnace 6.

The threaded members on the carriages 23 and 26 are constructed so that they can be put into or out of engagement with the lead screws 24 and 27. Accordingly, the chuck 2 can readily be moved to the left, as viewed in Figure 1, and the glass cane (standard glass canes are five feet long) to be treated may be passed through the furnace 6 and over the former 7 to be secured at its left hand end in the chuck 2, the chuck 3 then being moved close to the furnace 6 so as to receive the right hand end of the tube or cane 1. The motor 19 is started, so that the former 7 is rotated and the air exhausted from the rear end of the tube 1. The two carriages 23 and 26 are locked into driving engagement with the lead screws 24 and 27 and, as soon as the furnace has softened the glass, the main motor 29 is started so that the tube 1 is fed through the furnace 6. In the case of a tube of low-expansion glass the speed with which the tube passes the furnace is controlled to heat the glass to about 800° C. The gearing between the motor 29 and the chucks 2 and 3 is such that the chuck 2 can be arranged to move at a speed of from 2½ to 10 inches per minute, while the chuck 3 can be arranged to move at a speed of from 5 to 10 inches per minute. Generally the speed ratio is so contrived that the chuck 3 moves substantially faster than the chuck 2. In action, both chucks move from left to right as viewed in Figure 1, and, therefore the guide 5 is made longer than the guide 4. In an example where the initial tube or cane weighs 16 ounces and has an internal diameter of about "1" with a wall thickness of about 2½ m./m. the finished tube has an accurate bore of ⅞" diameter and a wall thickness of 1¼ m./m. In the treatment of this tube, therefore, its length is approximately doubled.

To adjust the internal diameter of the tube, the former 7 may be tapered by approximately one or two thousandth of an inch in its length of approximately eight to ten inches. Then the required adjustment may be effected by moving the former longitudinally with respect to the furnace. This may be accomplished by screwing the rod 8 into the worm 20 in order to vary the position of the former slightly with respect to the area in which the glass is in a semi-plastic condition. If the former is very slightly tapered, a very slight adjustment in the diameter of the internal surface is obtained.

I claim:

1. A method for providing a pre-formed thermoplastic tube with a fine quality internal surface comprising the steps of moving the tube over and in engagement with a surface having the dimensions of the desired internal dimensions of said tube, heating the tube in the vicinity of its engagement with said surface, and controlling the speed of movement of the tube so that the movement in the direction away from said surface is greater than that toward said surface.

2. A method for providing a pre-formed thermoplastic tube with a fine quality internal surface comprising the steps of moving the tube in a longitudinal direction, positively limiting the cross-sectional dimensions of the interior of the tube at one point of its movement, heating the tube in the vicinity of said positive limitation, and controlling the rate of movement of the tube so that the movement from the area of positive limitation is greater than the rate of movement toward it.

3. A method of providing a pre-formed thermoplastic tube with a fine quality internal surface comprising the steps of moving the tube in a longitudinal direction over and in engagement with a surface, rotating said surface about the axis of said tube so that said surface traces a figure of circular cross-section the outer dimension of which is equal to the desired inner dimension of the finished tube, heating the tube in the vicinity of said engagement with said surface, and controlling the rate of longitudinal movement of the tube so that said movement from the area of heating is greater than the rate of movement toward said area of heating.

4. A method of providing a pre-formed thermoplastic tube with a fine quality internal surface comprising the steps of moving the tube in a longitudinal direction over a surface of less diameter than the internal diameter of the tube, rotating said surface about the axis of said tube, heating the tube in the vicinity of said surface, and controlling the rate of longitudinal movement of the tube so that said movement from the area of heating is greater than the rate of movement toward said area of heating, thereby reducing the diameter of said tube and causing engagement of same with said rotating surface.

5. A method for providing a pre-formed thermoplastic tube with a fine quality internal surface comprising the steps of moving the tube in a longitudinal direction over and in engagement with a surface, rotating said surface about the axis of said tube so that said surface traces a figure of circular cross-section, the outer dimension of which is equal to the desired inner dimension of the finished tube, heating the tube in the vicinity of said engagement with said surface, controlling the rate of longitudinal movement of the tube so that said movement from the area of heating is greater than the rate of movement toward said area of heating, and evacuating said tube beyond said surface.

6. A method for providing a pre-formed thermoplastic tube with a fine quality internal surface comprising the steps of moving, at a given rate of speed, the rearward end of said tube toward and over a tube engaging surface of smaller cross-section than said tube, heating the tube in the vicinity of its engagement with said surface, withdrawing the forward end of said tube from said engaging surface at a speed greater than its first-mentioned speed thereby causing said tube to contract onto said surface, and evacuating said tube beyond said surface.

SAMUEL JAMES EVERETT.

REFERENCES CITED

The following references are of record in the file of this patent:

UNITED STATES PATENTS

| Number | Name | Date |
| --- | --- | --- |
| 1,301,714 | Kueppers | Apr. 22, 1919 |
| 2,393,979 | Everett | Feb. 5, 1946 |

FOREIGN PATENTS

| Number | Country | Date |
| --- | --- | --- |
| 241,544 | Great Britain | Apr. 1, 1926 |
| 360,340 | Germany | Oct. 2, 1922 |